(12) United States Patent
Molander et al.

(10) Patent No.: US 6,658,304 B1
(45) Date of Patent: Dec. 2, 2003

(54) COMPUTER BASED METHOD AND A SYSTEM FOR CONTROLLING AN INDUSTRIAL PROCESS

(75) Inventors: Mats Molander, Västerås (SE); Michael Lundh, Västerås (SE)

(73) Assignee: ABB AB, Vasteras (SE)

( * ) Notice: Subject to any disclaimer, the term of this patent is extended or adjusted under 35 U.S.C. 154(b) by 419 days.

(21) Appl. No.: 09/679,627

(22) Filed: Oct. 5, 2000

(30) Foreign Application Priority Data

May 10, 1999 (SE) .............................................. 9903592

(51) Int. Cl.⁷ .............................................. G05B 13/02
(52) U.S. Cl. .............................. 700/45; 700/41; 700/42; 700/43; 700/44; 700/52; 700/67; 700/68; 700/69; 700/70
(58) Field of Search .............................. 700/44–45, 52, 700/67–70, 41–43

(56) References Cited

U.S. PATENT DOCUMENTS

| | | | |
|---|---|---|---|
| 4,656,854 A | * | 4/1987 | Stewart et al. ................. 72/8.7 |
| 4,698,745 A | | 10/1987 | Hiroi et al. |
| 4,714,988 A | | 12/1987 | Hiroi et al. |
| 5,504,692 A | * | 4/1996 | Cardner ....................... 700/266 |
| 5,586,221 A | * | 12/1996 | Isik et al. ...................... 706/23 |
| 5,901,059 A | * | 5/1999 | Tao et al. ...................... 700/29 |

* cited by examiner

*Primary Examiner*—Ramesh Patel
*Assistant Examiner*—Douglas M. Shute
(74) *Attorney, Agent, or Firm*—Birch, Stewart, Kolasch & Birch, LLP

(57) ABSTRACT

A computer based method of controlling an industrial process, including the steps of measuring the values of at least one process variable ($y_1$, $y_2$), and predicting future deviations of one process variable ($y_1$) with regard to the measured value of said at least one process variable ($y_1$, $y_2$), and providing a control signal ($u_{FB}$) based on said predictions, and by means of a first control law. The method comprises the further steps of measuring a measurable disturbance (d) in the process, predicting future deviations of said process variable ($y_1$) with regard to said disturbance but without regard to the measured value of said at least one process variable ($y_1$, $y_2$), and providing a control signal ($u_d$) based on said predictions by means of a second control law.

25 Claims, 1 Drawing Sheet

COMPUTER BASED METHOD AND A SYSTEM FOR CONTROLLING AN INDUSTRIAL PROCESS

FIELD OF THE INVENTION

The present invention relates to a computer based method of controlling an industrial process, including the steps of measuring the values of at least one process variable, and predicting future deviations of at least one process variable with regard to the measured value of said at least one process variable, and providing a control signal based on said prediction by means of a first control law.

The invention also relates to a computer based system for controlling an industrial process, comprising means for providing a control signal based on a prediction of future deviations of a process variable with regard to a measured value of at least one process variable, said means comprising a first control law for executing said provision of the control signal.

The term "measuring" as defined herein should be regarded in a broad sense. Accordingly, in-line, on-line, and lab measurements should be included.

The term "industrial process" includes continuous, semi-continuous, and batch processes.

Furthermore, the invention particularly relates to methods and systems in which predictions of future variable deviations are preceded by corresponding estimations of inner states in the process.

A future deviation of a process variable, as defined herein, refers to the difference between a predicted future value of said process variable and a future set point value for the variable in question.

The invention particularly includes the application of data driven stochastic system models or empirical models for the purpose of control of different continuous or semi-continuous processes.

Even though the invention is applicable to all kinds of continuous and semi-continuous processes, it is particularly useful in connection to the manufacture of chemical, petrochemical, and polymer products, and continuous pulp and paper production, in which there is a need of controlling the stream compositions in order to obtain the required product properties.

Typically, the invention is applicable to processes like the ones in distillation towers. Here, process variables such as the concentration in the product, the pressure, the temperature, etc., are measured. For example, the future deviation of the concentration in the product is the one being predicted with regard to the measured value or values of said process variables. Process parameters, such as the flow in the tower, the supply of heat, and pressure build-up are adjusted with regard to the executed predictions. Similar applications are found in the processes of fractionators and cracker devices.

The invention is also typically applicable to digesters for continuous pulp production. In such an application, process variables, such as Kappa number, liquor phase variables like the effective alkali, dissolved lignin concentration, dissolved solid concentration, and sulphidity are measured, normally for the purpose of predicting a future value of the Kappa number. Process parameters, such as the supply of heat, are then controlled in order to control the process.

PRIOR ART

Systems and methods of prior art for controlling continuous or semi-continuous processes of the kind defined above also take measurable disturbances in the process in consideration. Such disturbances could be of any kind affecting the value of the process variable for which a future deviation is predicted by means of a given control law.

According to prior art, said control law is adapted to deal with a plurality of variables or inputs, including measured disturbances. As a result, the control law in question becomes relatively complicated. Furthermore, such an arrangement necessitates tailored adaptation of the control law for each individual process which is to be controlled in this way with regard to measured values of certain process variables and measured disturbances.

OBJECT OF THE INVENTION

The object of the present invention is to provide a computer based method and system for controlling a continuous or semi-continuous process, said method and system being adapted to the need of controlling the process with regard to a measurement of a measurable disturbance in the process. In particular, the inventive method and system shall devise ways of facilitating the tuning of a specific control system for a given process with regard to contradictory requirements on rapidity and stability.

SUMMARY OF THE INVENTION

The object of the invention is achieved through a method as initially defined, which is characterised in that it comprises the further steps of measuring a measurable disturbance in the process, predicting future deviations of said process variable with regard to said disturbance but without regard to the measured value of said at least one process variable, and providing a control signal based on said prediction by means of a second control law. Accordingly, two separate control laws are used, and two degrees of freedom are obtained. The function of the first control law can be optimised with regard to the predictions based on the measured value of the process variable or variables, while the second control law can be optimised with regard to the prediction of the deviations of said process variable with regard to the measured disturbances.

For most processes, the adjustments of different process parameters based on the prediction of a future deviation of a given process variable have to be cautious due to complex dynamic behaviours of the process and/or to the measured process variable not being easily accessible. However, upon an introduction of a disturbance in the process, a more rapid or extensive adjustment of such a process parameter is often desired. Control laws according to prior art which has to consider these requirements simultaneously tend to get complex and complicated. With the inventive solution using two degrees of freedom and two separate control laws, the alertness of the control of the process with regard to measurable disturbances on one hand and model errors and variable measurements on the other hand can easily and separately be determined.

One or more process parameters in the process are controlled with regard to the control signals provided by means of said first and second control laws. The control signals, based on the predicted deviations and provided by said control laws are added to each other and the control of said parameter or parameters is executed with regard to the sum of the separate control signals. For the implementation of the method, signals corresponding or representative to said sum should be delivered to relevant units from a computer environment in which said control laws define software.

Often, it is also desired that the adjustment of said process parameter or parameters should not be too extensive.

Therefore, according to the inventive method, a minimum value and a maximum value are set for the sum of the control signals based on predicted deviations. Furthermore, the control signal values are added sequentially to each other in a predetermined order. Thereby, the value of the first control signal, to which a second control signal is added, will possibly delimit the contribution of the second control signal in combination with the minimum value and maximum value restrictions. By adding the control signals in a predetermined order, the inventive method proposes a way of prioritise the contribution to the sum of the signals from the different control laws.

According to a preferred embodiment, the prediction used by the first control law is based on a measurement of a first and/or a second process variable, the second process variable being more readily accessible and/or more instantly responsive to non-measured disturbances in the process than the first process variable.

Preferably, it is the future deviations of the first process variable which are predicted and then treated by means of said first and second control laws. As the second variable is more readily accessible and/or more instantly responsive to the non-measured or non-measurable disturbances in the process than the first process variable, a more rapid and exact prediction of the first process variable can be executed upon the presence of a non-measured disturbance to which the second variable will react more instantly than the first variable, or at least more rapidly than the value of the first variable can be measured. It should be understood that even though, in some cases, the first variable might react instantly on the disturbance, the measured value of the first variable will not be accessible as instantly as the measured value of the second variable. Accordingly, the delay of the provision of the first variable upon the presence of such a disturbance could be due to the change of the value itself being delayed or due to a slow measuring procedure. A typical application in which this inventive solution is applicable is for the control of a digester for the continuous production of pulp, wherein the non-measured or non-measurable disturbance could be the chip bulk density, the chip moisture content, or the initial lignin concentration of the wood. The first process variable could then be the Kappa number and the second process variable could be a variable which is measurable on-line, i.e. any liquor phase variable, like the effective alkali, dissolved lignin concentration, etc. However, the invention is applicable to all kinds of processes with similar conditions.

The inventive method also comprises the step of estimating an inner state in the process by means of a state space model, and based on the measurements of said process variables. The prediction executed is based on the estimated inner state. Traditionally, the means for estimating the state of the process preferably comprises a state space model of the following form:

$$x_{k+1} = Ax_k + Bu_k + B_d d_k + W_k$$

$$y_k = Cx_k + V_k$$

in which the vector x comprises the inner states of the process, w stands for non-measurable process disturbances, y represents all measured process variables, and v stands for measurement noise and d represents measurable disturbances. According to the invention, the measurable disturbances d could be excluded from the model. An inner state cannot be measured, and in order to be of any use, the measurements must be combined with a so-called observer, which estimates the state of a process based on the measuring signals. This type of model is advantageous, as it can also describe unstable processes, and a measurement signal vector is permitted to contain signals that are only used in the observer in order to find the inner states with the purpose of thereby improving the prediction calculations. Preferably, the model is used for the design of a Kalman filter. By means of such a Kalman filter, a prediction of the state of the process can be obtained by use of the measurements of the first and second variable.

According to a further embodiment, the inventive method comprises the further step of predicting a future deviation of said process variable, with regard to a change of a set point value for said process variable, but without regard to the measured values of said at least one process variable, and providing a control signal based on said prediction by means of a third separate control law. It is well-known that, upon a change of the set point value, there is often a desire for quite a rapid and extensive adjustment of relevant process parameters. If one and the same control law has to provide control signals based on the predictions of the deviation of said process variable with regard to both model errors and the measurements of the process variables on one hand and the change of the set point value on the other hand, the tuning of the control system with regard to contradictory requirements will become somewhat difficult and complicated. According to the inventive method, such a control law is therefor split up into two separate control laws, one of which handles the deviation prediction with respect to the changed set point value separately. Hence, rather uncomplicated control laws that are easily adapted to different processes are permitted, and the tuning of a control system comprised by such separate control laws is facilitated.

Relevant process parameters are now controlled with regard to the control signals provided by means of said first, second, and third control laws. The control signals provided by the first, second, and third control laws are added to each other, and the control of said parameter or parameters is executed with regard to the sum thereof. As mentioned earlier, a minimum value and a maximum value are set for said sum, and the control signal values are added sequentially to each other in a predetermined order.

Further features and advantages of the present invention will be presented in the following description and in the enclosed, dependent claims.

BRIEF DESCRIPTION OF THE DRAWING

Hereinafter, the invention will be described by way of example, with reference to the annexed drawing, on which.

DETAILED DESCRIPTION OF A PREFERRED EMBODIMENT

Figure 1:
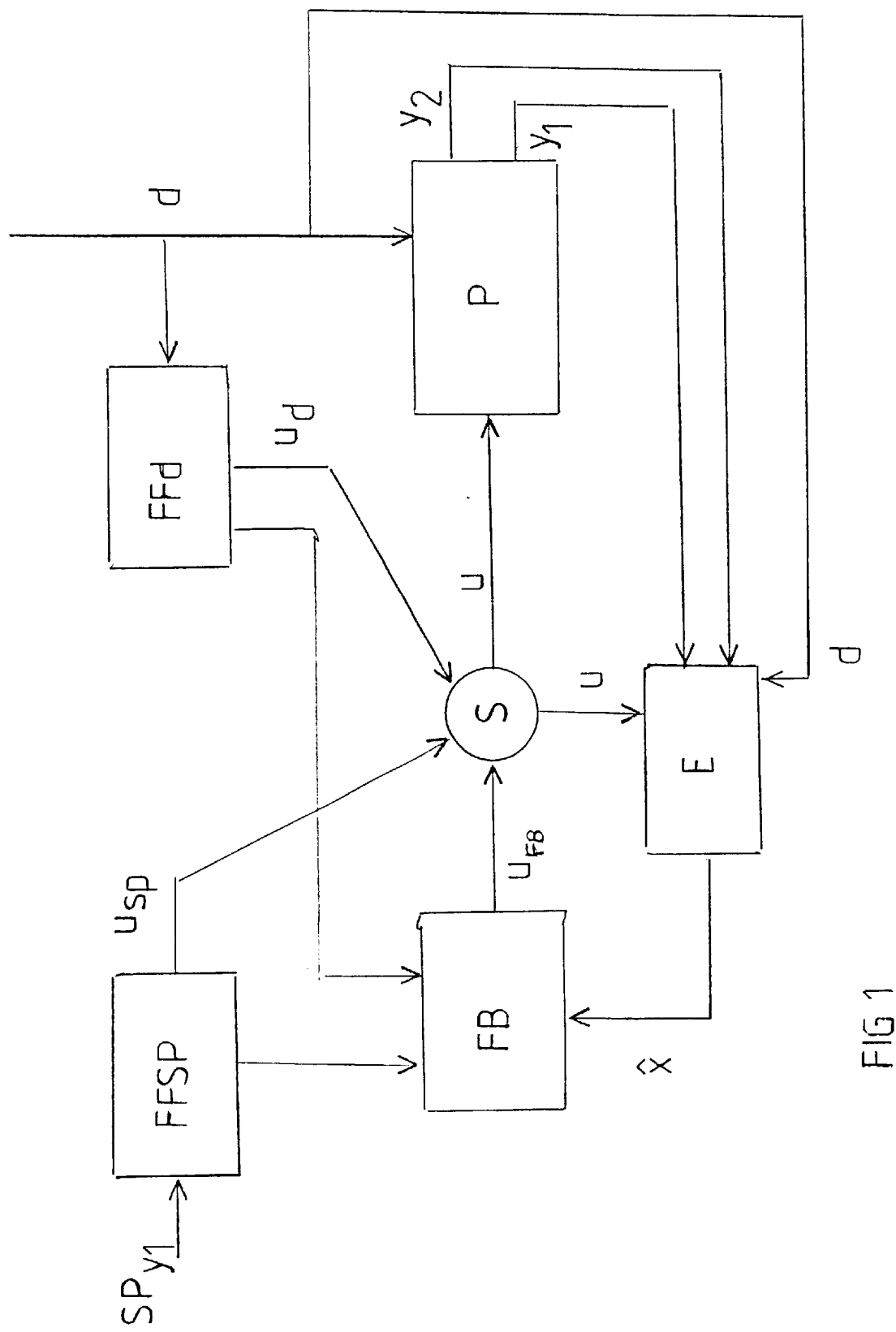
FIG. 1 is a schematic flow-chart showing the essential ingredients in the inventive method and the inventive system.

FIG. 1 shows the schematic representation of the overall control scheme of the system for implementing the method of the invention. The block denoted P indicates the process, which for example, could be the process in any chemical, petrochemical or polymer production line or in a pulp and paper production line. Accordingly, the process could be the process in a distillation tower, fractionator, cracker device, or a continuous digester for pulp production.

The computer based system according to the invention comprises measuring devices, preferably sensors, for measuring a first process variable $y_1$, a second process variable $y_2$ and a measurable disturbance d. The disturbance could be any kind of measurable disturbance affecting the process P. The system comprises an estimator E, to which the measured process variables or at least signals corresponding to the values of the measured variables $y_1$, $y_2$ are directed. The estimator E comprises a state space model known per se for the purpose of estimating an inner state $\hat{x}$ of the process with regard to the measured values of said variables $y_1$, $y_2$, a control signal u and a measurable disturbance d. The estimator E is arranged to direct a signal or a plurality of signals representing the inner state $\hat{x}$ to a feedback block FB which comprises a first software for predicting a future deviation of the first variable $y_1$. Said prediction is based on the measured values of the first and second variables $y_1$, $y_2$ indirectly and the inner state $\hat{x}$ directly. The block FB also comprises a first control law for calculating and providing a control signal $U_{FB}$ based on said prediction.

The first process variable $y_1$ typically defines a particularly relevant property of the product leaving the process. In the processes mentioned above, the first variable $y_1$ is preferably the concentration of a component in the final product, for example the lignin concentration in pulp.

The second variable $y_2$ is more easily accessible and/or more instantly responsible to non-measurable disturbances in the process than is the first variable $y_1$. Accordingly, the measurement of the second process variable $y_2$ contributes to a more exact estimation by the estimator E. The second process variable is preferably measurable in-line or on-line, and is typically a temperature, a flow rate, or a pressure in the process.

The inventive system also comprises means FFd for predicting a future deviation of the first process variable $y_1$ with regard to a measured value d of a measurable disturbance in the process P, but without regard to the measured value of the first and second process variable $y_1$, $y_2$, said means FFd comprising a separate, second control law for providing a control signal $u_d$ based on said prediction. The means FFd for predicting the future deviation of the first process variable $y_1$ are schematically represented by the box FFd, in which FFd indicates forward feeding of the measured disturbance d. The control signal $u_d$ is added to the control signal $u_{FB}$ provided by the first control law of the feedback block FB. Accordingly, the system comprises a means S for adding the separate control signals $u_{FB}$ and $u_d$. The means FFd does not take the values of the measured first and second variables $y_1$, $y_2$ into consideration when predicting the future deviation of the first variable $y_1$. Hence, it can be optimised for provision of a control signal with regard to the measured disturbance d.

The system also comprises a means FFSP for predicting a future deviation of the first process variable $y_1$ with regard to a change of a set point value $SP_{y1}$ for said process variable $y_1$ but without regard to the measured values of the process variables $y_1$, $y_2$, said means FFSP comprising a separate, third control law for providing, or more precisely, computing a control signal $u_{SP}$ based on said prediction. FFSP stands for forward feeding of the set point. The software for the prediction of the future deviation of the first variable $y_1$ only with regard to changes of the set point value $SP_{y1}$ is represented by the box FFSP. The set point values $SP_{y1}$ could be delivered to the block FFSP, including the third control law, either manually or automatically. The control signal computed by the third control law is added by the adding means S to the control signals $u_{FB}$ and $u_d$ computed by the first and second control laws of the system. The control signal $u_{SP}$ is provided for the purpose of compensating for deviations caused by a changed set point value.

The adding means S comprises software arranged to add the compensating control signals $u_{FB}$, $u_d$, $u_{SP}$ computed by the first, second, and third control laws for the purpose of providing a sum u with regard to which one or more process parameters are controlled. Typical such process parameters are temperature, pressure, flow rate, etc. In reality, the adding means S is preferably arranged to deliver a vector valued signal representing the sum u to individual operating units of the process equipment for affecting one or more of said process parameters.

Said means S is also preferably arranged to deliver a signal representing the sum u to the estimator E, as shown in the figure. The estimator E is arranged to estimate the inner state $\hat{x}$ with regard to the most recent compensating control signal u computed by the system. Also the measured disturbance d is delivered to the estimator E and $\hat{x}$ is calculated with regard also to d.

The adding means S is arranged to add the control signals $u_{FB}$, $u_d$, $u_{SP}$ sequentially in a predetermined order, but not letting the sum u thereof go beyond a range delimited by a minimum value $u_{min}$ and a maximum value $u_{max}$. The reason for this arrangement has already been discussed.

As described above the inventive system presents three separate control laws and three degrees of freedom. This feature makes the inventive system easy to adapt to various kinds of processes to be controlled.

The means FB, FFSP, and FFd for predicting the future deviations of a given process variable, in this case the first variable $y_1$, and computing the minimising compensation signals $u_{FB}$, $u_{SP}$ and $u_d$, are preferably arranged as software in a computer. The software contains computer program code portions suitable for controlling a general purpose computer or even a processor arranged in a computer based system according to the invention, and for making the computer or processor carry out the steps of the invention.

Of course, a plurality of embodiments of the invention will be obvious for a man skilled in the art without thereby leaving the scope of the invention as defined in the appended claims supported by the description and the drawing.

For example, the blocks or means FFSP and FFd with their respective control laws may be arranged as to deliver signals to the feedback block FB for the purpose of indicating the effect of the respective compensation control signals $u_{SP}$ and $u_d$ on the inner state $\hat{x}$. In order to show this possibility, lines from the blocks FFSP and FFd to the feedback block FB are included in the drawing.

It should also be realised that the control laws used could be of the same principal sort or differ from each other.

Furthermore, it should be understood that the control signals $u_{FB}$, $u_d$ and $u_{SP}$ represents compensation needed for the adjustment of certain process parameters in order to minimise the future deviation of said variable $y_1$. Accordingly, they represent values, the sum of which should be within a given interval $u_{min}$–$u_{max}$. The control laws comprise software for computing the necessary compensations represented by said control signals.

What is claimed is:

1. A computer based method of controlling an industrial process, including the steps of
measuring the values of at least one process variable,
measuring a measurable disturbance in the process,
estimating an inner state of the process by means of a state space model and based on the measured values of said process variable, the measurable disturbance, and a control signal, based on a first and a second control signal, controlling the process,
performing a first prediction of future deviations of at least one process variable with regard to the estimated inner state of the process, providing said first control signal based on said first prediction of future deviations by means of a first control law, performing a second prediction of future deviations of said process variable with regard to said disturbance but without regard to the measured value of said at least one process variable and, providing said second control signal based on said second prediction of future deviations by means of a second control law.

2. A method according to claim 1, wherein one or more process parameters in the process are controlled with regard to the control signals provided by means of said first and second control law.

3. A method according to claim 1, wherein the control signals provided by means of the first and second control law are added to each other, and the control of said parameter or parameters is executed with regard to the sum thereof.

4. A method according to claim 3, wherein a minimum value and a maximum value are set for said sum, and that the first and second control signal are added sequentially to each other in a predetermined order.

5. A method according to any one of claims 1, wherein the predictions used by the first control law are based on measurements of a first and/or a second process variable, the second process variable being more readily accessible and/or more instantly responsive to non-measured disturbances in the process than the first process variable.

6. A method according to claim 5, wherein it is the future deviation of the first process variable which is predicted and compensated for by means of said first and second control laws.

7. A method according to claim 1, wherein it comprises the further step of predicting a future deviation of said process variable with regard to a change of a set point value for said process variable, but without regard to the measured values of said at least one process variable, and providing a third control signal based on said prediction by means of a third separate control law.

8. A method according to claim 7, wherein a process parameter in the process is controlled with regard to the control signals provided by means of said first, second and third control laws.

9. A method according to claim 8, wherein the control signals provided by the first, second, and third control laws are added to each other, and that the control of said parameter or parameters is executed with regard to the sum thereof.

10. A method according to claim 9, wherein a minimum value and a maximum value are set for said sum, and that the control signals are added sequentially to each other in a predetermined order.

11. A method according to claim 10, wherein said parameter or parameters is/are controlled by directing a signal representative to the sum of the control signals to one or more operative units for affecting said process parameter or parameters.

12. A method according to claim 1, wherein said measurements comprise any one of or a combination of in-line, on-line, or lab-measurements, and that at least said control laws define a software in a computer.

13. A computer based system for controlling an industrial process, comprising means for estimating an inner state of the process based on a measured value of at least one process variable, a measured value of a measurable disturbance in the process, and a control signal, based on a first and a second control signal, controlling the process, means for performing a first prediction of future deviations of one process variable based on the estimated inner state, comprising a first control law for providing said first control signal based on said first prediction, and means for performing a second prediction of future deviations of said process variable with regard to the measured value of the disturbance in the process, but without regard to the measured value of said at least one process variable, comprising a separate second control law for providing said second control signal based on said second prediction.

14. A system according to claim 13, wherein it comprises a means for adding the control signals provided by the first and second control law for the purpose of providing a sum, with regard to which one or more process parameters are controlled.

15. A system according to claim 14, wherein said adding means is arranged so as to add the control signals sequentially in a predetermined order, but not letting the sum thereof go beyond a range delimited by a minimum value and a maximum value.

16. A system according to claim 13, wherein said means for estimating an inner state of the process estimates the inner state based on the measurement of a first process variable and a second process variable which is more easily accessible and/or more instantly responsive than the first variable to a non-measured disturbance in the process.

17. A system according to claim 16, wherein it is the future deviation of the first process variable which is minimized by means of said first and second control laws.

18. A system according to any one of claims 17, wherein it comprises a means (FFSP) for predicting a future deviation of said process variable ($y_1$) with regard to a change of a set point value for said process variable but without regard to the measured values of said at least one process variable, said means (FFSP) comprising a separate, third control law for providing a third control signal based on said prediction.

19. A system according to claim 14, wherein the adding means is arranged to add the control signals provided by the first, second, and third control laws for the purpose of providing a sum with regard to which said one or more process parameters are controlled.

20. A system according to claim 19, wherein said adding means is arranged to add the control signals sequentially in a predetermined order, but not letting the sum thereof go beyond a range delimited by a minimum value and a maximum value.

21. A system according to claim 13, wherein it comprises means for directing a signal representing a sum of the control signals provided by said control laws to one or more operative units for affecting one or more process parameters.

22. A system according to claim 13, wherein it comprises one or more means for measuring said process variables and disturbances, in-line, on-line or through lab measurements in order to provide said control laws with signals corresponding to the results of the measurements.

23. A system according to claim 13, wherein at least said control laws define software in a computer.

24. A computer program code element comprising computer code means for enabling a processor arranged in a computer based system for controlling an industrial process, wherein it enables said processor to carry out the steps of:

receiving data input representing a measurement of at least one process variable, receiving a second data input representing a measurable disturbance, estimating an inner state of the process by means of a state space model and based on said received data input representing a measurement of at least process variable, said received data representing a measurable disturbance, and a control signal, based on a first and a second control signal, controlling the process, performing a first prediction of future deviations of at least one process variable with regard to the estimated inner state, providing said first control signal, based on said first prediction of future deviations by means of a first control law, performing a second prediction of future deviations of said process variable with regard to the disturbance but without regard to the measured value of said at least one process variable, and providing said second control signal based on said second prediction by means of a second control law.

25. A computer program code element according to claim 24 contained in a computer readable medium.

* * * * *